UNITED STATES PATENT OFFICE.

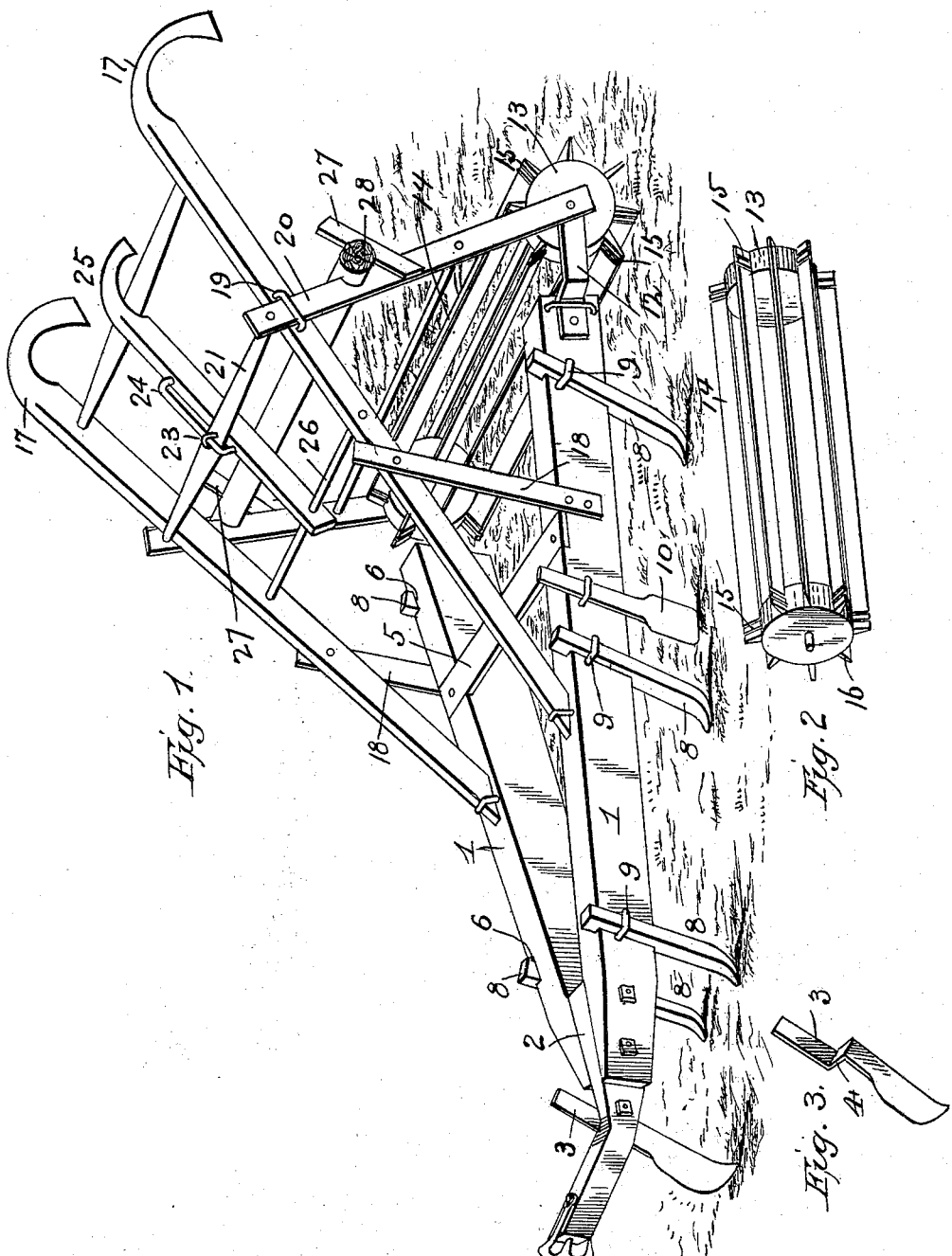

JESSE S. FORD, OF WESTERFIELD, KENTUCKY.

CULTIVATOR.

SPECIFICATION forming part of Letters Patent No. 610,176, dated September 6, 1898.

Application filed November 3, 1897. Serial No. 657,239. (No model.)

*To all whom it may concern:*

Be it known that I, JESSE S. FORD, a citizen of the United States, and a resident of Westerfield, in the county of Ohio and State of Kentucky, have invented certain new and useful Improvements in Cultivators; and I do hereby declare that the following is a full, clear, and exact description of the invention, which will enable others skilled in the art to which it appertains to make and use the same, reference being had to the accompanying drawings, which form a part of this specification.

My invention relates to cultivators; and its object is to provide an improved construction of the same which shall possess superior advantages with respect to efficiency in operation.

The invention consists in the novel construction and combination of parts hereinafter fully described and claimed.

In the accompanying drawings, Figure 1 is a perspective view of a cultivator constructed in accordance with my invention. Fig. 2 is a perspective view of the rotatable cutter removed. Fig. 3 is a detail perspective view of the colter.

In the said drawings the reference-numeral 1 designates the beams, inclined or converging toward their front ends, where they are secured to a head-block 2, to which is bolted a collar 3, formed with a shoulder 4 intermediate its ends, whereby it may be centered with the block and which also aids in holding it in place. Said beams are connected together by a transverse bar 5 and on their outer sides are formed with inclined grooves 6 to receive the cultivator-teeth 8, which are secured in place therein by staples 9. Also secured to said beams are flat teeth 10, which regulate the depth of penetration of the teeth 8 and also serve to guide the cultivator when working on a hillside, the flattened ends running in the furrow cut by the teeth in front thereof.

Pivoted to the rear of the beam are brackets 12, which pass through guide-staples secured to the beams, and to the outer ends of these brackets are journaled cylindrical blocks 13, to which are secured transverse cutters 14 by staples 15. These cutters are beveled at one side, as seen at 16.

The numeral 17 designates handles secured to the beams and supported by bars 18. They are also provided on their outer sides with staples 19, through which loosely pass bars 20, the lower ends of which are connected with the journals of the blocks 13. From this it will be seen that said rotatable cutter is capable of a vertical movement, so that it can ride over rocks and other obstructions. These bars 20 at their upper ends are connected by a transverse rod 21, provided with a staple 23, which engages with a bar 24, secured to a lever 25, pivoted to a cross-bar 26, secured to the handles. By pressing down upon this lever when the cultivator is passing or running over bushes, vines, or the like the rotatable cutter is forced down, so that the blades or cutters will chop up the same.

Secured to the bars 20 at an angle thereto are bars 27 to receive a removable weight 28, consisting of a log of wood having a saw-kerf near each end which engage with the edges of the bar 28, whereby the log is held in place.

Having thus described my invention, I claim—

1. In a cultivator, the combination with the converging beams, the handles and the bar connecting the same, of the brackets pivoted to the rear of said beams, the staples through which they pass, the rotatable cutter, the bars connected with the journals of said cutter, the staples secured to the handles through which said bars pass, the cross-bar and staple, the lever and the rod secured thereto engaging with said staple, substantially as described.

2. In a cultivator of the character described, the combination with the inclined beams, the pivoted brackets at the rear, and the rotatable cutter, of the bars connected with said cutter, the arms secured thereto at an angle, the removable weight having saw-kerfs at the end engaging with said bars, the handles and the cross-bar located above the same connecting the said bars connected with the cutter, substantially as specified.

In testimony that I claim the foregoing as my own I have hereunto affixed my signature in presence of two witnesses.

JESSE S. FORD.

Witnesses:
H. C. FORD,
S. K. COX.